US012057629B2

(12) United States Patent
Zhang et al.

(10) Patent No.: US 12,057,629 B2
(45) Date of Patent: Aug. 6, 2024

(54) ANTENNA AND ANTENNA PROCESSING METHOD

(71) Applicant: HUAWEI TECHNOLOGIES CO., LTD., Guangdong (CN)

(72) Inventors: Runxiao Zhang, Dongguan (CN); Zihui Liu, Dongguan (CN); Yuanhong Zhang, Wuhan (CN); Xiaolin Zhou, Shanghai (CN); Lei Li, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 216 days.

(21) Appl. No.: 17/692,294

(22) Filed: Mar. 11, 2022

(65) Prior Publication Data

US 2022/0200142 A1 Jun. 23, 2022

Related U.S. Application Data

(63) Continuation of application No. PCT/CN2020/096666, filed on Jun. 17, 2020.

(30) Foreign Application Priority Data

Sep. 12, 2019 (CN) ......................... 201910873603.5

(51) Int. Cl.
*H01Q 1/52* (2006.01)
*H01Q 1/38* (2006.01)
*H01Q 21/00* (2006.01)

(52) U.S. Cl.
CPC ............... *H01Q 1/523* (2013.01); *H01Q 1/38* (2013.01); *H01Q 21/0006* (2013.01)

(58) Field of Classification Search
CPC ...... H01Q 1/523; H01Q 1/38; H01Q 21/0006; H01Q 1/526; H01Q 21/0075;
(Continued)

(56) References Cited

U.S. PATENT DOCUMENTS 5,416,492 A * 5/1995 Takahashi .......... H01Q 21/0068
333/237
10,062,965 B2 * 8/2018 De Flaviis ........... H01Q 9/0435
(Continued)

FOREIGN PATENT DOCUMENTS

CN 105655702 A 6/2016
CN 206461088 U 9/2017
(Continued)

OTHER PUBLICATIONS

Extended European Search Report issued in EP20863460.0, dated Oct. 6, 2022, 10 pages.
(Continued)

*Primary Examiner* — Dimary S Lopez Cruz
*Assistant Examiner* — Austin M Back

(57) ABSTRACT

Embodiments of this application relate to the field of antenna technologies, and provide an antenna and an antenna processing method, to reduce structural complexity and assembly difficulty of an antenna, thereby ensuring performance of the antenna. The antenna includes a feeding base plate and a plurality of radiation apparatuses disposed on the feeding base plate, where the feeding base plate is configured to feed power to the plurality of radiation apparatuses; and each of the plurality of radiation apparatuses includes a first insulating base and a first metal conducting layer attached to the first insulating base, the feeding base plate includes a plate-shaped second insulating base and a second metal conducting layer attached to the second insulating base, and first insulating bases and the second insulating base are integrated together. The antenna provided in the embodiments of this application may be used for a multiple-input multiple-output communications system.

9 Claims, 14 Drawing Sheets

(58) Field of Classification Search
CPC ...... H01Q 21/061; H01Q 21/24; H01Q 21/26; H01Q 25/001; H01Q 1/50; H01Q 21/0087
See application file for complete search history.

(56) References Cited

U.S. PATENT DOCUMENTS

| | | | | |
|---|---|---|---|---|
| 10,476,173 | B2 * | 11/2019 | Daojian | H01Q 21/26 |
| 2006/0273865 | A1 * | 12/2006 | Timofeev | H01Q 3/36 333/161 |
| 2016/0226156 | A1 | 8/2016 | So et al. | |
| 2017/0085009 | A1 | 3/2017 | Watson | |
| 2017/0125917 | A1 * | 5/2017 | Lin | H01Q 9/16 |
| 2018/0159217 | A1 * | 6/2018 | Mikata | H01L 23/552 |

FOREIGN PATENT DOCUMENTS

| | | | | | |
|---|---|---|---|---|---|
| CN | 107528115 | A | | 12/2017 | |
| CN | 108242597 | A | | 7/2018 | |
| CN | 108417998 | A | | 8/2018 | |
| CN | 207800902 | U | | 8/2018 | |
| CN | 109286073 | A | | 1/2019 | |
| CN | 208460951 | U | | 2/2019 | |
| CN | 208460951 | U | * | 2/2019 | |
| CN | 208570936 | U | | 3/2019 | |
| CN | 109640539 | A | | 4/2019 | |
| CN | 110190382 | A | | 8/2019 | |
| CN | 209804887 | U | | 12/2019 | |
| CN | 111063997 | A | | 4/2020 | |
| CN | 111193099 | A | | 5/2020 | |
| CN | 110676578 | B | * | 7/2021 | H01Q 1/38 |
| KR | 101644445 | B1 | | 8/2016 | |
| WO | 2017035726 | A1 | | 3/2017 | |

OTHER PUBLICATIONS

International Search Report and Written Opinion issued in PCT/CN2020/096666, dated Aug. 27, 2020, 10 pages.
Office Action issued in CN201910873603.5, dated Jul. 28, 2021, 7 pages.

* cited by examiner

ANTENNA AND ANTENNA PROCESSING METHOD

CROSS-REFERENCE TO RELATED APPLICATIONS

This application is a continuation of International Application No. PCT/CN2020/096666, filed on Jun. 17, 2020, which claims priority to Chinese Patent Application No. 201910873603.5, filed on Sep. 12, 2019. The disclosures of the aforementioned applications are hereby incorporated by reference in their entireties.

TECHNICAL FIELD

This application relates to the field of antenna technologies, and in particular, to an antenna and an antenna processing method.

BACKGROUND

In a background of 5G mobile communications, a higher requirement is imposed on an antenna structure for a multi-input and multi-output (MIMO) communications system.

FIG. 1 and FIG. 2 show an antenna applied to a multiple-input multiple-output communications system according to an existing technology. As shown in FIG. 1 and FIG. 2, the antenna includes a feeding base plate 101, a radiation apparatus array, and a shielding frame 102. The radiation apparatus array is disposed on the feeding base plate 101, the radiation apparatus array includes a plurality of radiation apparatuses 102 disposed in an array, and the radiation apparatus array can implement multichannel signal input and multichannel signal output. The feeding base plate 101 is configured to feed power to the radiation apparatus array. The shielding frame 102 is configured to shield the plurality of radiation apparatuses 102, to prevent crosstalk between each radiation apparatus 102 and another radiation apparatus 102. Currently, assembly between each radiation apparatus 102 and the feeding base plate 101 and assembly between components inside the radiation apparatus 102 are implemented in a manner such as welding or structural connection. In this case, the antenna includes a relatively large quantity of components and has relatively high structural complexity, and a large quantity of assembly operations and welding operations are required, leading to relatively high assembly difficulty. In addition, there are many welding points and connection points inside the antenna. As a result, it is difficult to ensure performance indexes of the antenna.

SUMMARY

Embodiments of this application provide an antenna and an antenna processing method, to reduce structural complexity and assembly difficulty of an antenna, thereby ensuring performance of the antenna.

To achieve the foregoing objective, the following technical solutions are used in the embodiments of this application.

According to a first aspect, an embodiment of this application provides an antenna, including a feeding base plate and a plurality of radiation apparatuses disposed on the feeding base plate. The feeding base plate is configured to feed power to the plurality of radiation apparatuses; and each of the plurality of radiation apparatuses includes a first insulating base and a first metal conducting layer attached to the first insulating base, the feeding base plate includes a plate-shaped second insulating base and a second metal conducting layer attached to the second insulating base, and first insulating bases and the second insulating base are integrated together.

The antenna provided in this embodiment includes the feeding base plate and the plurality of radiation apparatuses disposed on the feeding base plate, each of the plurality of radiation apparatuses includes the first insulating base and the first metal conducting layer attached to the first insulating base, the feeding base plate includes the second insulating base and the second metal conducting layer attached to the second insulating base, and the first insulating bases and the second insulating base are integrated together. Therefore, the first insulating bases and the second insulating base form an integrated structure, and conduction between the radiation apparatuses and the feeding base plate can be implemented by attaching first metal conducting layers to the first insulating bases, attaching the second metal conducting layer to the second insulating base, and making the first metal conducting layers connected to the second metal conducting layer. In this way, a manner such as welding or structural connection does not need to be used to implement assembly between the radiation apparatuses and the feeding base plate and assembly between components inside the radiation apparatuses. In this case, the antenna includes a relatively small quantity of components and has relatively low structural complexity, and no welding or assembly operations are required, so that assembly difficulty is relatively low. In addition, there is no welding point or connection point inside the antenna. Therefore, performance of the antenna can be ensured.

With reference to the first aspect, in a first optional implementation of the first aspect, the first insulating base includes a radiation base and a feeding base, the radiation base is of a plate-shaped structure and the radiation base is parallel to the second insulating base, the feeding base is connected between the radiation base and the second insulating base, the feeding base is of a columnar structure, a length direction of the feeding base is perpendicular to the second insulating base, a cross section of the columnar structure is a cruciform cross section, the feeding base includes a central column in an intersection area whose cross section is the cruciform cross section and four feeding substrates partitioned by the central column, and the four feeding substrates include a first feeding substrate and a third feeding substrate opposite to each other and a second feeding substrate and a fourth feeding substrate opposite to each other, a plurality of radiation apparatuses are arranged along bisectors of included angles between first feeding substrates and second feeding substrates of the plurality of radiation apparatuses, the bisectors of the included angles between the first feeding substrates and the second feeding substrates are parallel to each other, an included angle area defined by the first feeding substrate and the second feeding substrate is a first area, an included angle area defined by the third feeding substrate and the fourth feeding substrate is a second area, a first through hole is provided in a part that is of the second insulating base and that is corresponding to the first area, and a second through hole is provided in a part that is of the second insulating base and that is corresponding to the second area; and the first metal conducting layer includes a metal radiation layer and a metal feeding layer, the metal radiation layer is attached to the radiation base, and the metal feeding layer is attached to the feeding base. In this way, the plurality of first insulating bases and the second insulating base can be integrated by using a mold whose movable parts are to be ejected along a first direction, a second direction, and a third direction. The first direction and the second direction are two directions opposite to each other that are parallel to the second insulating base and that are perpendicular to an arrangement direction of the plurality of radiation apparatuses. The third direction is a direction that is perpendicular to the second insulating base and that points from the second insulating base to a side that is of the second insulating base and that is away from the first insulating base. The first insulating base of such structure is a base structure of a commonly used dual-polarized radiation apparatus, and has a relatively wide application range.

With reference to the first optional implementation of the first aspect, in a second optional implementation of the first aspect, a reinforcing plate is disposed between two adjacent radiation apparatuses, and the reinforcing plate is connected to the second insulating base and radiation bases of the two adjacent radiation apparatuses. In this way, strength of a connection between the plurality of first insulating bases and the second insulating base can be improved by using the reinforcing plate.

With reference to the second optional implementation of the first aspect, in a third optional implementation of the first aspect, the reinforcing plate is parallel to the arrangement direction of the plurality of radiation apparatuses, the reinforcing plate is perpendicular to the second insulating base, and the reinforcing plate and the second insulating base are integrated together. In this way, during molding of the plurality of first insulating bases and the second insulating base by using the mold whose movable parts are to be ejected along the first direction, the second direction, and the third direction, the reinforcing plate can be molded. In this case, the antenna includes a relatively small quantity of components, and assembly difficulty is relatively low.

With reference to the first, the second, or the third optional implementation of the first aspect, in a fourth optional implementation of the first aspect, the metal feeding layer includes a first metal feeding layer and a second metal feeding layer, a third through hole is provided at a position that is on the first feeding substrate and that is close to the central column, one inner surface that is of the third through hole and that is close to the central column is coplanar with a surface of the second feeding substrate and a surface of the fourth feeding substrate, and the first metal feeding layer is attached to the surface of the second feeding substrate, the inner surface that is of the third through hole and that is close to the central column, and the surface of the fourth feeding substrate; a fourth through hole is provided at a position that is on the second feeding substrate and that is close to the central column, one inner surface that is of the fourth through hole and that is close to the central column is coplanar with a surface of the first feeding substrate and a surface of the third feeding substrate, and the second metal feeding layer is attached to the surface of the first feeding substrate, the inner surface that is of the fourth through hole and that is close to the central column, and the surface of the third feeding substrate; and a distance between the third through hole and the second insulating base is different from a distance between the fourth through hole and the second insulating base. In this way, power can be fed to the metal radiation layer by using two feeding structures: the first metal feeding layer and the second metal feeding layer, and this structure is simple and is easy to implement.

With reference to the fourth optional implementation of the first aspect, in a fifth optional implementation of the first aspect, one inner surface that is of the third through hole and that is away from the central column is perpendicular to the arrangement direction of the plurality of radiation apparatuses, and two inner surfaces connected between the inner surface that is of the third through hole and that is close to the central column and the inner surface that is of the third through hole and that is away from the central column are parallel to the second insulating base; and one inner surface that is of the fourth through hole and that is away from the central column is perpendicular to the arrangement direction of the plurality of radiation apparatuses, and two inner surfaces connected between the inner surface that is of the fourth through hole and that is close to the central column and the inner surface that is of the fourth through hole and that is away from the central column are parallel to the second insulating base. In this way, during molding of the plurality of first insulating bases and the second insulating base by using the mold whose movable parts are to be ejected along the first direction, the second direction, and the third direction, the third through hole and the fourth through hole can be molded, thereby reducing difficulty of molding the antenna.

With reference to the first, the second, or the third optional implementation of the first aspect, in a sixth optional implementation of the first aspect, the metal feeding layer includes a first metal feeding layer, a second metal feeding layer, a third metal feeding layer, and a fourth metal feeding layer; and the first metal feeding layer is attached to the first feeding substrate, the second metal feeding layer is attached to the second feeding substrate, the third metal feeding layer is attached to the third feeding substrate, and the fourth metal feeding layer is attached to the fourth feeding substrate. In this way, power can be fed to the metal radiation layer by using each of four feeding structures: the first metal feeding layer, the second metal feeding layer, the third metal feeding layer, and the fourth metal feeding layer, with no need to provide a hole in the feeding base.

With reference to the first aspect, in a seventh optional implementation of the first aspect, the first insulating base includes a radiation base and a feeding base, the radiation base is of a plate-shaped structure and the radiation base is parallel to the second insulating base, the feeding base is connected between the radiation base and the second insulating base, the feeding base is of a columnar structure, a length direction of the feeding base is perpendicular to the second insulating base, a cross section of the columnar structure is a cruciform cross section, the feeding base includes a central column in an intersection area whose cross section is the cruciform cross section and four feeding substrates partitioned by the central column, and all projection, on a plane on which the radiation base is located, of ends that are of the four feeding substrates and that are away from the central column is located outside an edge of the radiation base, and a fifth through hole is provided in an area that is on the second insulating base and that is opposite to the radiation base; and the first metal conducting layer includes a metal radiation layer and a metal feeding layer, the metal radiation layer is attached to the radiation base, and the metal feeding layer is attached to the feeding base. In this way, the plurality of first insulating bases and the second insulating base can be integrated by using a mold whose movable parts are to be ejected along a direction perpendicular to the second insulating base. In addition, the first insulating base of such structure is a base structure of a commonly used dual-polarized radiation apparatus, and has a relatively wide application range.

With reference to the seventh optional implementation of the first aspect, in an eighth optional implementation of the first aspect, the metal feeding layer includes a first metal feeding layer and a second metal feeding layer, and the four feeding substrates include a first feeding substrate and a third feeding substrate opposite to each other and a second feeding substrate and a fourth feeding substrate opposite to each other; a first notch is provided at a position that is close to the central column and that is on an end face of one end that is of the first feeding substrate and that is connected to the second insulating base, one inner side surface that is of the first notch and that is close to the central column is coplanar with a surface of the second feeding substrate and a surface of the fourth feeding substrate, and the first metal feeding layer is attached to the surface of the second feeding substrate, the inner side surface that is of the first notch and that is close to the central column, and the surface of the fourth feeding substrate; and a first groove is provided at a position, opposite to one end that is of the second feeding substrate and that is close to the central column, on a surface that is of the radiation base and that is away from the feeding base, the first groove extends in a depth direction into the end that is of the second feeding substrate and that is close to the central column, and one inner side surface that is of the first groove and that is close to the central column is coplanar with a surface of the first feeding substrate and a surface of the third feeding substrate; and the first metal feeding layer is attached to the surface of the first feeding substrate, the inner side surface that is of the first groove and that is close to the central column, and the surface of the third feeding substrate. In this way, power can be fed to the metal radiation layer by using two feeding structures: the first metal feeding layer and the second metal feeding layer, and this structure is simple and is easy to implement.

With reference to the seventh optional implementation of the first aspect, in a ninth optional implementation of the first aspect, the metal feeding layer includes a first metal feeding layer, a second metal feeding layer, a third metal feeding layer, and a fourth metal feeding layer, and the four feeding substrates include a first feeding substrate and a third feeding substrate opposite to each other and a second feeding substrate and a fourth feeding substrate opposite to each other; and the first metal feeding layer is attached to the first feeding substrate, the second metal feeding layer is attached to the second feeding substrate, the third metal feeding layer is attached to the third feeding substrate, and the fourth metal feeding layer is attached to the fourth feeding substrate. In this way, power can be fed to the metal radiation layer by using each of four feeding structures: the first metal feeding layer, the second metal feeding layer, the third metal feeding layer, and the fourth metal feeding layer, with no need to provide a notch or a groove in the feeding base.

With reference to the first aspect, in a tenth optional implementation of the first aspect, the second insulating base includes a first surface and a second surface that is away from the first surface, the first insulating base includes a radiation base and a feeding base, the radiation base is a boss disposed on the first surface, a second groove is provided at a position that is on the second surface and that is opposite to the radiation base, the feeding base is disposed in the second groove, and the feeding base is a columnar structure whose length direction is perpendicular to the second insulating base; and the first metal conducting layer includes a metal radiation layer and a metal feeding layer, the metal radiation layer is attached to the radiation base, and the metal feeding layer is attached to the feeding base. In this way, the plurality of first insulating bases and the second insulating base can be integrated by using a mold whose movable parts are to be ejected along a direction perpendicular to the second insulating base, and the mold is simple and is easy to implement.

With reference to the first aspect, in an eleventh optional implementation of the first aspect, the first insulating base is a columnar structure whose length direction is perpendicular to the second insulating base, the first metal conducting layer includes a metal radiation layer and a metal feeding layer, and both the metal radiation layer and the metal feeding layer are attached to the first insulating base. In this way, the plurality of first insulating bases and the second insulating base can be integrated by using a mold whose movable parts are to be ejected along a direction perpendicular to the second insulating base, and the mold is simple and is easy to implement.

With reference to the eleventh optional implementation of the first aspect, in a twelfth optional implementation of the first aspect, a cross section of the columnar structure is a cruciform cross section. In this way, the first insulating base has a simple structure, so that a mold for molding the entire structure has a simple structure, and the entire structure is easy to fabricate.

With reference to the twelfth optional implementation of the first aspect, in a thirteenth optional implementation of the first aspect, the first insulating base includes a central column in an intersection area whose cross section is the cruciform cross section and four insulating substrates partitioned by the central column, and the four insulating substrates include a first insulating substrate and a third insulating substrate opposite to each other and a second insulating substrate and a fourth insulating substrate opposite to each other; the metal feeding layer includes a first metal feeding layer and a second metal feeding layer; a third groove is provided at a position, opposite to one end that is of the first insulating substrate and that is close to the central column, on a surface that is of the second insulating base and that is away from the first insulating base, the third groove extends in a depth direction into the end that is of the first insulating substrate and that is close to the central column, one inner side surface that is of the third groove and that is close to the central column is coplanar with a surface of the second insulating substrate and a surface of the fourth insulating substrate, and the first metal feeding layer is attached to the surface of the second insulating substrate, the inner side surface that is of the third groove and that is close to the central column, and the surface of the fourth insulating substrate; and a second notch is provided at a position that is close to the central column and that is on an end face that is of the second insulating substrate and that is away from the second insulating base, one inner side surface that is of the second notch and that is close to the central column is coplanar with a surface of the first insulating substrate and a surface of the third insulating substrate, and the second metal feeding layer is attached to the surface of the first insulating substrate, the inner side surface that is of the second notch and that is close to the central column, and the surface of the third insulating substrate. In this way, power can be fed to the metal radiation layer by using two feeding structures: the first metal feeding layer and the second metal feeding layer, and this structure is simple and is easy to implement.

With reference to the eleventh optional implementation of the first aspect, in a fourteenth optional implementation of the first aspect, the columnar structure includes a first columnar structure located at a center and four second columnar structures located at edges, and a cross section of the first columnar structure is a cruciform cross section; the first columnar structure includes a central column in an intersection area whose cross section is the cruciform cross section and four insulating plates partitioned by the central column, the four second columnar structures are connected, in a one-to-one correspondence, to ends that are of the four insulating plates and that are away from the central column, and the second columnar structure is a hollow column; and the metal radiation layer is disposed on end faces of ends that are of the four second columnar structures and that are away from the second insulating base, and the metal feeding layer is attached to a side surface of the first columnar structure and side surfaces of the four second columnar structures. This structure has a relatively large area for disposing the metal radiation layer, so that the radiation apparatus has relatively excellent radiation performance.

With reference to any one of the first aspect or the first optional implementation to the fourteenth optional implementation of the first aspect, in a fifteenth optional implementation of the first aspect, the antenna further includes a shielding frame, where the shielding frame includes a first surface and a second surface that is away from the first surface, the shielding frame defines a plurality of cavities penetrating through the first surface and the second surface, the plurality of cavities are in a one-to-one correspondence with the plurality of radiation apparatuses, the first surface of the shielding frame is fastened to the second insulating base, and each radiation apparatus is located in a cavity corresponding to the radiation apparatus. Crosstalk between each radiation apparatus and another radiation apparatus can be avoided by using the shielding frame.

With reference to the fifteenth optional implementation of the first aspect, in a sixteenth optional implementation of the first aspect, the shielding frame includes a third insulating base and a third metal conducting layer attached to the third insulating base, and the third insulating base and the second insulating base are integrated together. In this way, a quantity of components included in the antenna can be reduced, and assembly complexity of the antenna can be reduced.

With reference to any one of the first aspect to the sixteenth optional implementation of the first aspect, in a seventeenth optional implementation of the first aspect, dielectric loss angular tangents of materials of the first insulating base and the second insulating base in a range of 600 MHz to 6 GHz are less than 0.01. In this way, after an electric field is applied to the materials of the first insulating base and the second insulating base, dielectric losses of the materials of the first insulating base and the second insulating base are relatively small, a relatively small amount of heat is generated, and performance of the antenna is relatively excellent.

With reference to the seventeenth optional implementation of the first aspect, in an eighteenth optional implementation of the first aspect, the first insulating base and the second insulating base comprise polyphenylene sulphide (PPS) and its modified material, polyphenylene oxide (PPO) and its modified material, liquid crystal polymer (LCP) and its modified material, polyetherimide (PEI) and its modified material, syndiotactic polystyrene (SPS) and its modified material, cyclic polyolefin and its modified material, or fluoroplastic and its modified material.

According to a second aspect, an embodiment of this application provides an antenna processing method. An antenna includes a feeding base plate and a plurality of radiation apparatuses disposed on the feeding base plate, each of the plurality of radiation apparatuses includes a first insulating base and a first metal conducting layer attached to the first insulating base, the feeding base plate includes a plate-shaped second insulating base and a second metal conducting layer attached to the second insulating base. The processing method includes: integrally molding first insulating bases of the plurality of radiation apparatuses and the second insulating base to form an integrated structure; and attaching a metal conducting layer to the integrated structure, where the metal conducting layer includes first metal conducting layers of the plurality of radiation apparatuses and the second metal conducting layer.

The antenna processing method provided in this embodiment of this application includes: integrally molding the first insulating bases of the plurality of radiation apparatuses and the second insulating base to form the integrated structure; and attaching the metal conducting layer to the integrated structure, where the metal conducting layer includes the first metal conducting layers of the plurality of radiation apparatuses and the second metal conducting layer. Therefore, a manner such as welding or structural connection does not need to be used to implement assembly between the radiation apparatuses and the feeding base plate and assembly between components inside the radiation apparatuses. In this case, the antenna includes a relatively small quantity of components and has relatively low structural complexity, and no welding or assembly operations are required, so that assembly difficulty is relatively low. In addition, there is no welding point or connection point inside the antenna. Therefore, performance of the antenna can be ensured.

With reference to the second aspect, in a first optional implementation of the second aspect, the attaching a metal conducting layer to the integrated structure includes: attaching a metal base layer to a surface of the integrated structure; isolating the metal base layer in a first area from the metal base layer in a second area through insulation, where the first area is an area that is on the surface of the integrated structure and in which the metal conducting layer is to be disposed, and the second area is an area on the surface of the integrated structure other than the area in which the metal conducting layer is to be disposed; attaching the metal conducting layer to the metal base layer in the first area by using an electroplating process; and removing the metal base layer in the second area. This method is simple, and the electroplating process is mature and is easy to implement.

DESCRIPTION OF EMBODIMENTS

Figure 1:
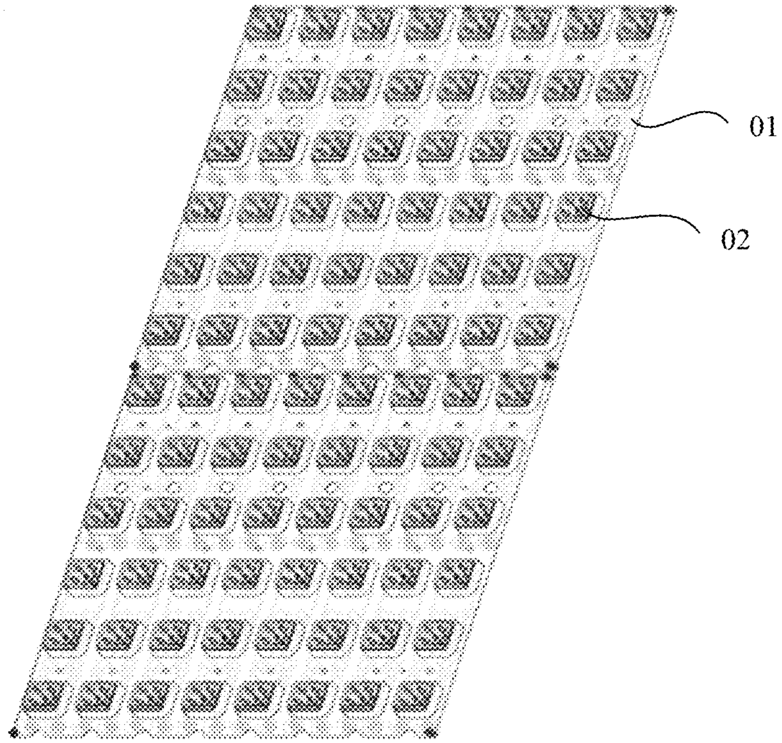
(PRIOR ART) FIG. 1
FIG. 1 is an assembly diagram of an antenna that does not include a shielding frame according to the conventional technology.
Figure 2:
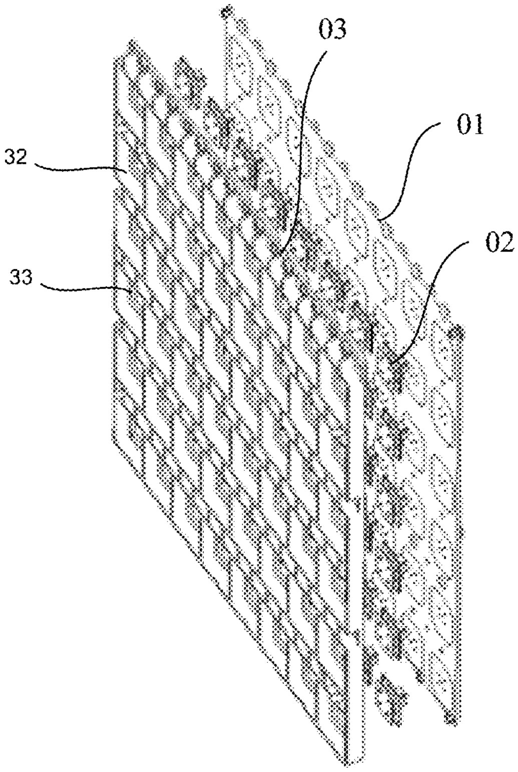
(PRIOR ART) FIG. 2
FIG. 2 is an exploded view of an antenna according to the conventional technology.
Figure 3:
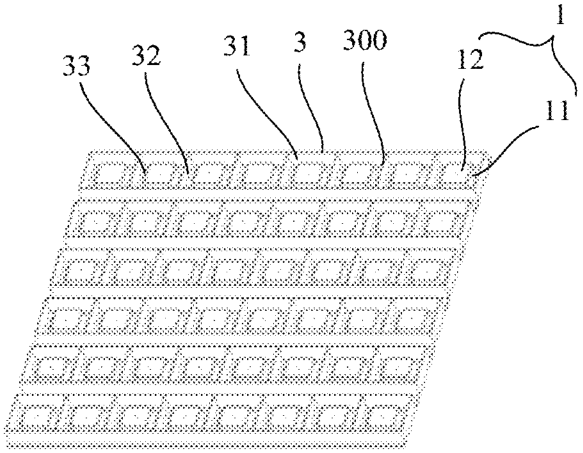
FIG. 3 is a schematic diagram of a front surface structure of a first type of antenna according to an embodiment of this application.
Figure 4:
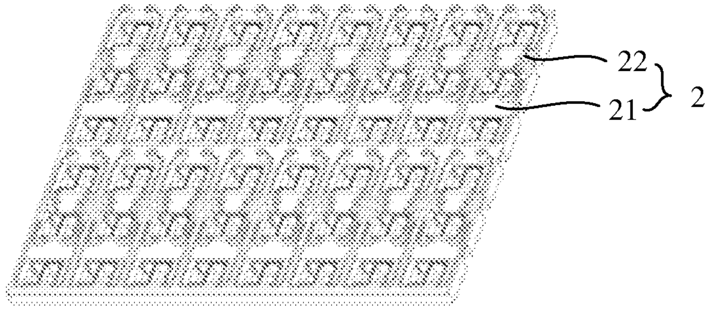
FIG. 4 is a schematic diagram of a back surface structure of the first type of antenna according to an embodiment of this application.

According to a first aspect, an embodiment of this application provides an antenna. As shown in FIG. 3 and FIG. 4, the antenna includes a feeding base plate 2 and a plurality of radiation apparatuses 1 disposed on the feeding base plate 2. The feeding base plate 2 is configured to feed power to the plurality of radiation apparatuses 1. Each of the radiation apparatuses 1 includes a first insulating base 11 and a first metal conducting layer 12 attached to the first insulating base 11, the feeding base plate 2 includes a plate-shaped second insulating base 21 and a second metal conducting layer 22 attached to the second insulating base 21, and first insulating bases 11 and the second insulating base 21 are integrated together.

It should be noted that, the first metal conducting layer 12 is a metal conducting layer used to implement functions such as signal radiation, signal transmission, or impedance matching, and the second metal conducting layer 22 is a metal conducting layer used to implement functions such as power allocation, phase adjustment, or signal transmission. To enable the feeding base plate 2 to feed power to the radiation apparatus 1, the first metal conducting layer 12 and the second metal conducting layer 22 should be connected to each other to implement electrical signal conduction.

As shown in FIG. 3 and FIG. 4, the antenna provided in this embodiment includes the feeding base plate 2 and the plurality of radiation apparatuses 1 disposed on the feeding base plate 2, the radiation apparatus 1 includes the first insulating base 11 and the first metal conducting layer 12 attached to the first insulating base 11, the feeding base plate 2 includes the second insulating base 21 and the second metal conducting layer 22 attached to the second insulating base 21, and the first insulating bases 11 and the second insulating base 21 are integrated together. Therefore, the first insulating bases 11 and the second insulating base 21 form an integrated structure, and conduction between the radiation apparatuses 1 and the feeding base plate 2 can be implemented by attaching first metal conducting layers 12 to the first insulating bases 11, attaching the second metal conducting layer 22 to the second insulating base 21, and making the first metal conducting layers 12 connected to the second metal conducting layer 22. In this way, a manner such as welding or structural connection does not need to be used to implement assembly between the radiation apparatuses 1 and the feeding base plate 2 and assembly between components inside the radiation apparatuses 1. In this case, the antenna includes a relatively small quantity of components and has relatively low structural complexity, and no welding or assembly operations are required, so that assembly difficulty is relatively low. In addition, there is no welding point or connection point inside the antenna. Therefore, performance of the antenna can be ensured.

In the foregoing embodiment, the first insulating base 11 is in a plurality of structural shapes. This is not specifically limited herein.

Figure 5:
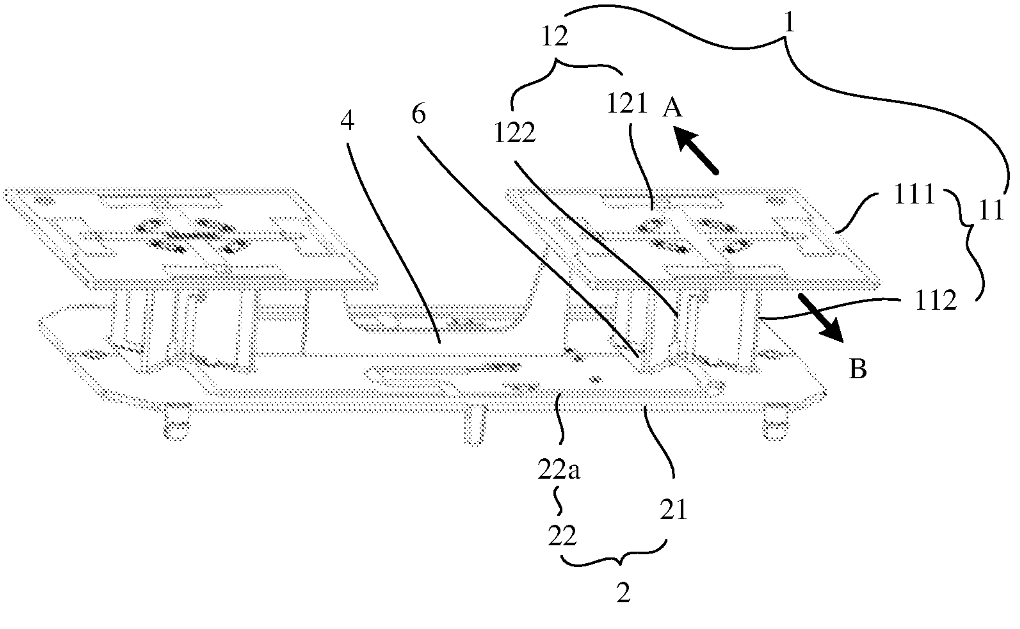
FIG. 5 is a stereoscopic diagram of a second type of antenna according to an embodiment of this application.
Figure 6:
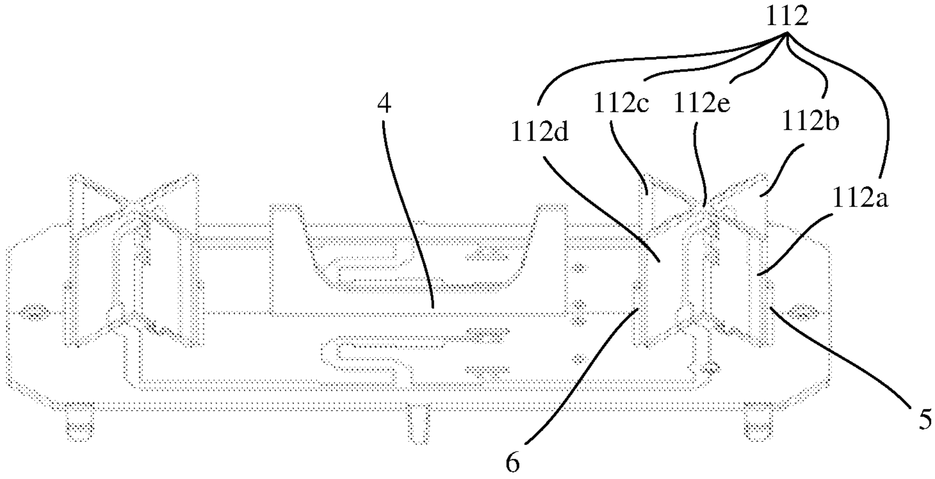
FIG. 6 is a stereoscopic diagram of a structure that is of the second type of antenna and that is obtained after a radiation base and a metal radiation layer are removed according to an embodiment of this application.

In a first optional embodiment, as shown in FIG. 5, the first insulating base 11 includes a radiation base 111 and a feeding base 112, the radiation base 111 is of a plate-shaped structure and the radiation base 111 is parallel to the second insulating base 21, the feeding base 112 is connected between the radiation base 111 and the second insulating base 21, the feeding base 112 is of a columnar structure, a length direction of the feeding base 112 is perpendicular to the second insulating base 21, and a cross section of the columnar structure is a cruciform cross section. As shown in FIG. 6, the feeding base 112 includes a central column 112*e* in an intersection area whose cross section is the cruciform cross section and four feeding substrates partitioned by the central column 112*e*, and the four feeding substrates include a first feeding substrate 112*a* and a third feeding substrate

Figure 7:
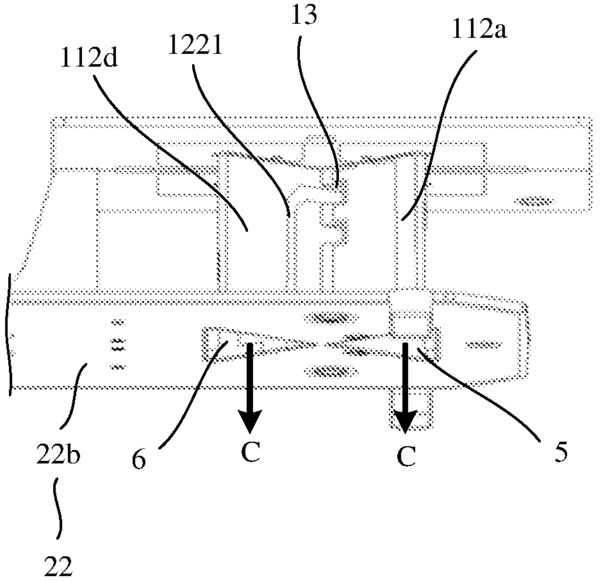
FIG. 7 is a schematic diagram of structures of a first feeding substrate, a fourth feeding substrate, a first metal feeding layer, and a third through hole in the second type of antenna according to an embodiment of this application.
Figure 10:
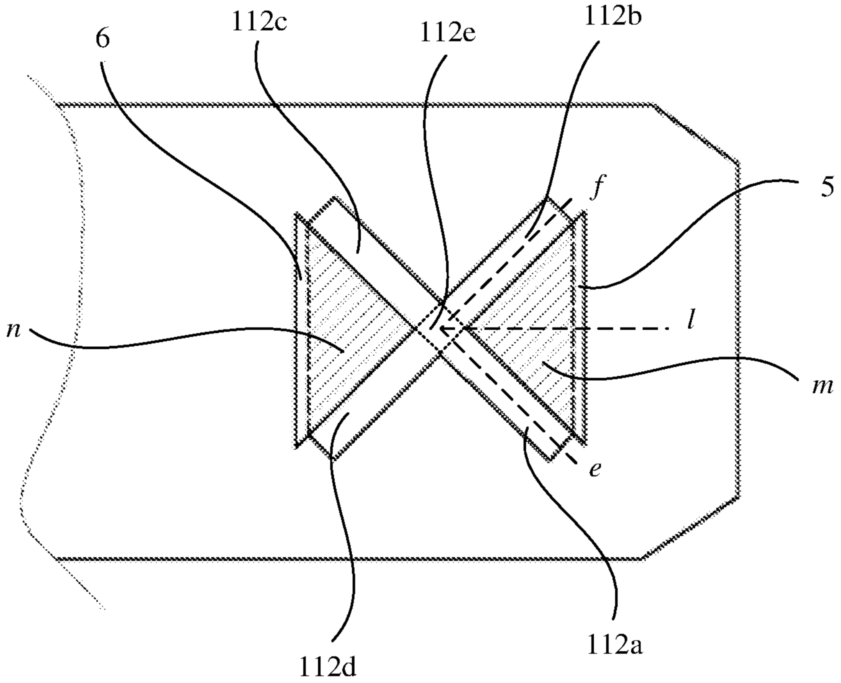
FIG. 10 is a top view of the structure that is of the second type of antenna and that is obtained after the radiation base and the metal radiation layer are removed according to an embodiment of this application.

112*c* opposite to each other and a second feeding substrate 112*b* and a fourth feeding substrate 112*d* opposite to each other. One of the plurality of radiation apparatuses 1 is arranged along a bisector (namely, a line l in FIG. 10) of an included angle between the first feeding substrate 112*a* and the second feeding substrate 112*b*, bisectors of included angles between first feeding substrates 112*a* and second feeding substrates 112*b* of the plurality of radiation apparatuses 1 are parallel to each other, an included angle area (namely, an area m in FIG. 10) defined by the first feeding substrate 112*a* and the second feeding substrate 112*b* is a first area, and an included angle area (namely, an area n in FIG. 10) defined by the third feeding substrate 112*c* and the fourth feeding substrate 112*d* is a second area. As shown in FIG. 7 and FIG. 10, a first through hole 5 is provided in a part that is of the second insulating base 21 and that is corresponding to the first area, and a second through hole 6 is provided in a part that is of the second insulating base 21 and that is corresponding to the second area. As shown in FIG. 5, the first metal conducting layer 12 includes a metal radiation layer 121 and a metal feeding layer 122, the metal radiation layer 121 is attached to the radiation base 111, and the metal feeding layer 122 is attached to the feeding base 112. In this way, the plurality of first insulating bases 11 and the second insulating base 21 can be integrated by using a mold whose movable parts are to be ejected along a first direction (namely, a direction A in FIG. 5), a second direction (namely, a direction B in FIG. 5), and a third direction (namely, a direction C in FIG. 7). As shown in FIG. 5, the first direction and the second direction are two directions opposite to each other that are parallel to the second insulating base 21 and that are perpendicular to an arrangement direction of the plurality of radiation apparatuses 1. As shown in FIG. 7, the third direction is a direction that is perpendicular to the second insulating base 21 and that points from the second insulating base 21 to a side that is of the second insulating base 21 and that is away from the first insulating base 11. The first insulating base 11 of such structure is a base structure of a commonly used dual-polarized radiation apparatus 1, and has a relatively wide application range.

In the foregoing embodiment, as shown in FIG. 10, the bisector (namely, the line l in FIG. 10) of the included angle between the first feeding substrate 112*a* and the second feeding substrate 112*b* is a bisector of an included angle between a bisecting plane e of the first feeding substrate 112*a* in a thickness direction and a bisecting plane f of the second feeding substrate 112*b* in the thickness direction. A side surface that is of the first feeding substrate 112*a* and that is close to the second feeding substrate 112*b* is a first side surface, and a side surface that is of the second feeding substrate 112*b* and that is close to the first feeding substrate 112*a* is a second side surface. A plane formed by an edge that is of the first side surface and that is away from the central column 112*e* and an edge that is of the second side surface and that is away from the central column 112*e* is a first plane. The included angle area defined by the first feeding substrate 112*a* and the second feeding substrate 112*b* is a space area, namely, the area m in FIG. 10, defined by the first side surface, the second side surface, and the first plane. A side surface that is of the third feeding substrate 112*c* and that is close to the fourth feeding substrate 112*d* is a third side surface, and a side surface that is of the fourth feeding substrate 112*d* and that is close to the third feeding substrate 112*c* is a fourth side surface. A plane formed by an edge that is of the third side surface and that is away from the central column 112*e* and an edge that is of the fourth side surface and that is away from the central column 112*e* is a second plane. The included angle area defined by the third feeding substrate 112*c* and the fourth feeding substrate 112*d* is a space area, that is, the area n in FIG. 10, defined by the third side surface, the fourth side surface, and the second plane.

It should be noted that, a projection area that is of the first area on the second insulating base 21 and that faces a surface of the second insulating base 21 is a first projection area, a projection area that is of the first through hole 5 on the second insulating base 21 and that faces the surface of the second insulating base 21 is a second projection area, a projection area that is of the second area on the second insulating base 21 and that faces the surface of the second insulating base 21 is a third projection area, and a projection area that is of the second through hole 6 on the second insulating base 21 and that faces the surface of the second insulating base 21 is a fourth projection area. The first projection area, the second projection area, the third projection area, and the fourth projection area are all triangular projection areas. To enable the plurality of first insulating bases 11 and the second insulating base 21 to be integrated by using the mold whose movable parts are to be ejected along the first direction, the second direction, and the third direction, the second projection area overlaps the first projection area, or two edges that are of the second projection area and that are close to the central column 112*e* are collinear with two edges that are of the first projection area and that are close to the central column 112*e*, and the other edge of the second projection area is located on a side that is of the other edge of the first projection area and that is away from the central column 112*e*; and the fourth projection area overlaps the third projection area, or two edges that are of the fourth projection area and that are close to the central column 112*e* are collinear with two edges that are of the third projection area and that are close to the central column 112*e*, and the other edge of the fourth projection area is located on a side that is of the other edge of the third projection area and that is away from the central column 112*e*.

In some embodiments, as shown in FIG. 5 and FIG. 6, a reinforcing plate 4 is disposed between two adjacent radiation apparatuses 1, and the reinforcing plate 4 is connected to the second insulating base 21 and radiation bases 111 of the two adjacent radiation apparatuses 1. In this way, strength of a connection between the plurality of first insulating bases 11 and the second insulating base 21 can be improved by using the reinforcing plate 4.

In some embodiments, as shown in FIG. 5 and FIG. 6, the reinforcing plate 4 is parallel to the arrangement direction of the plurality of radiation apparatuses 1, the reinforcing plate 4 is perpendicular to the second insulating base 21, and the reinforcing plate 4 and the second insulating base 21 are integrated together. In this way, during molding of the plurality of first insulating bases 11 and the second insulating base 21 by using the mold whose movable parts are to be ejected along the first direction, the second direction, and the third direction, the reinforcing plate 4 can be molded. In this case, the antenna includes a relatively small quantity of components, and assembly difficulty is relatively low.

The metal feeding layer 122 is in a plurality of structural forms. This is not specifically limited herein.

Figure 8:
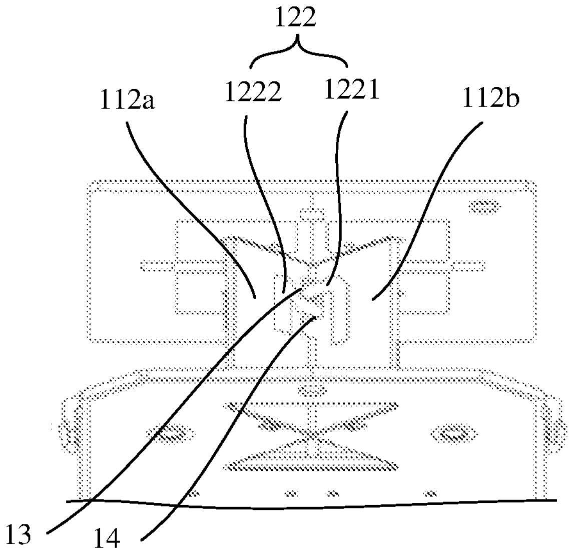
FIG. 8 is a schematic diagram of structures of a first feeding substrate, a second feeding substrate, a first metal feeding layer, a second metal feeding layer, a third through hole, and a fourth through hole in the second type of antenna according to an embodiment of this application.
Figure 9:
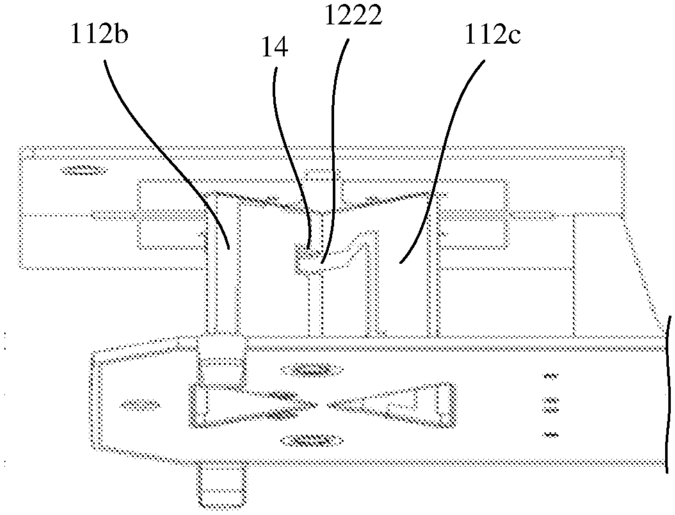
FIG. 9 is a schematic diagram of structures of a second feeding substrate, a third feeding substrate, a second metal feeding layer, and a fourth through hole in the second type of antenna according to an embodiment of this application.

In some embodiments, as shown in FIG. 7, FIG. 8, and FIG. 9, the metal feeding layer 122 includes a first metal feeding layer 1221 and a second metal feeding layer 1222. A third through hole 13 is provided at a position that is on the first feeding substrate 112*a* and that is close to the central column, one inner surface that is of the third through hole 13 and that is close to the central column is coplanar with a surface of the second feeding substrate 112*b* and a surface of the fourth feeding substrate 112*d*, and the first metal feeding layer 1221 is attached to the surface of the second feeding substrate 112*b*, the inner surface that is of the third through hole 13 and that is close to the central column, and the surface of the fourth feeding substrate 112*d*. A fourth through hole 14 is provided at a position that is on the second feeding substrate 112*b* and that is close to the central column, one inner surface that is of the fourth through hole 14 and that is close to the central column is coplanar with a surface of the first feeding substrate 112*a* and a surface of the third feeding substrate 112*c*, and the second metal feeding layer 1222 is attached to the surface of the first feeding substrate 112*a*, the inner surface that is of the fourth through hole 14 and that is close to the central column, and the surface of the third feeding substrate 112*c*. A distance between the third through hole 13 and the second insulating base 21 is different from a distance between the fourth through hole 14 and the second insulating base 21. In this way, power can be fed to the metal radiation layer 121 by using two feeding structures: the first metal feeding layer 1221 and the second metal feeding layer 1222, and this structure is simple and is easy to implement.

In the foregoing embodiments, optionally, as shown in FIG. 7, FIG. 8, and FIG. 9, one inner surface that is of the third through hole 13 and that is away from the central column is perpendicular to the arrangement direction of the plurality of radiation apparatuses 1, and two inner surfaces connected between the inner surface that is of the third through hole 13 and that is close to the central column and the inner surface that is of the third through hole 13 and that is away from the central column are parallel to the second insulating base 21; and one inner surface that is of the fourth through hole 14 and that is away from the central column is perpendicular to the arrangement direction of the plurality of radiation apparatuses 1, and two inner surfaces connected between the inner surface that is of the fourth through hole 14 and that is close to the central column and the inner surface that is of the fourth through hole 14 and that is away from the central column are parallel to the second insulating base 21. In this way, during molding of the plurality of first insulating bases 11 and the second insulating base 21 by using the mold whose movable parts are to be ejected along the first direction, the second direction, and the third direction, the third through hole 13 and the fourth through hole 14 can be molded, thereby reducing difficulty of molding the antenna.

In some other embodiments, the metal feeding layer 122 includes a first metal feeding layer, a second metal feeding layer, a third metal feeding layer, and a fourth metal feeding layer; and the first metal feeding layer is attached to the first feeding substrate 112*a*, the second metal feeding layer is attached to the second feeding substrate 112*b*, the third metal feeding layer is attached to the third feeding substrate 112*c*, and the fourth metal feeding layer is attached to the fourth feeding substrate 112*d*. In this way, power can be fed to the metal radiation layer 121 by using each of four feeding structures: the first metal feeding layer, the second metal feeding layer, the third metal feeding layer, and the fourth metal feeding layer, with no need to provide a hole in the feeding base 112.

Figure 13:
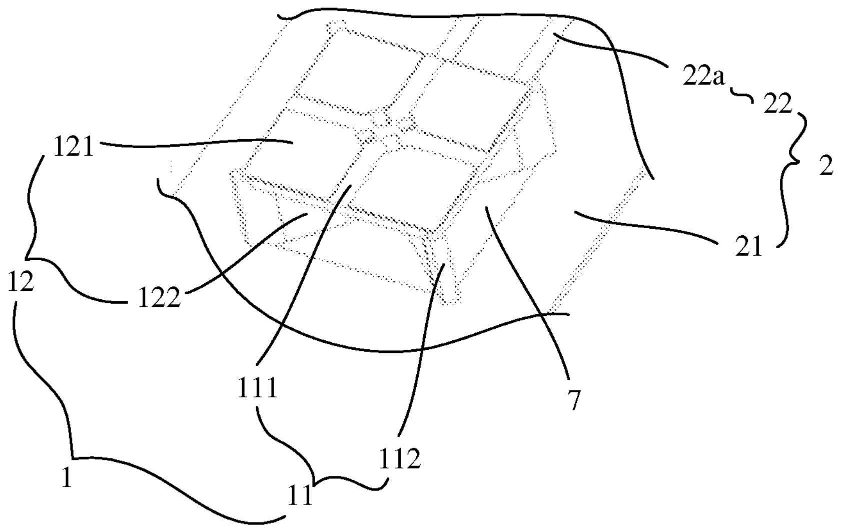
FIG. 13 is a schematic diagram of a partial front surface structure of the third type of antenna according to an embodiment of this application.
Figure 14:
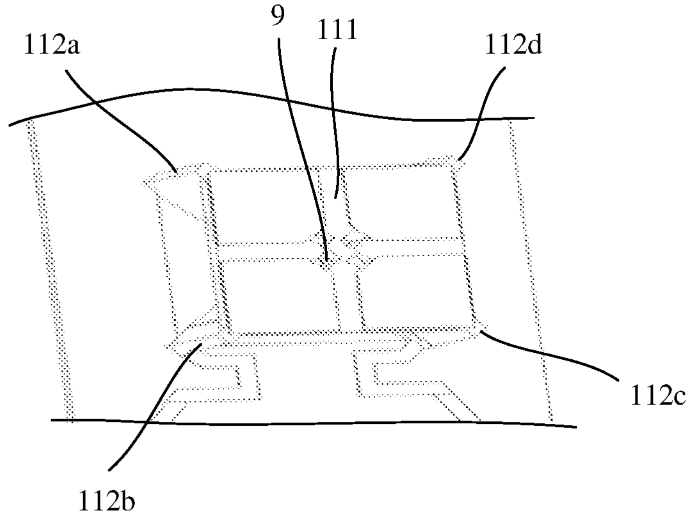
FIG. 14 is a schematic diagram of structures of a first feeding substrate, a second feeding substrate, a third feeding substrate, a fourth feeding substrate, and a first groove in the third type of antenna according to an embodiment of this application.

In a second optional embodiment, as shown in FIG. 13, the first insulating base 11 includes a radiation base 111 and a feeding base 112, the radiation base 111 is of a plate-shaped structure and the radiation base 111 is parallel to the second insulating base 21, the feeding base 112 is connected between the radiation base 111 and the second insulating base 21, the feeding base 112 is of a columnar structure, a length direction of the feeding base 112 is perpendicular to the second insulating base 21, and a cross section of the columnar structure is a cruciform cross section. As shown in FIG. 14, the feeding base 112 includes a central column (not shown in the figure) in an intersection area whose cross section is the cruciform cross section and four feeding substrates partitioned by the central column. As shown in FIG. 13, all projection, on a plane on which the radiation base 111 is located, of ends that are of the four feeding substrates and that are away from the central column is located outside an edge of the radiation base 111, and a fifth through hole 7 is provided in an area that is on the second insulating base 21 and that is opposite to the radiation base 111. The first metal conducting layer 12 includes a metal radiation layer 121 and a metal feeding layer 122, the metal radiation layer 121 is attached to the radiation base 111, and the metal feeding layer 122 is attached to the feeding base 112. In this way, the plurality of first insulating bases 11 and the second insulating base 21 can be integrated by using a mold whose movable parts are to be ejected along a direction perpendicular to the second insulating base 21. In addition, the first insulating base 11 of such structure is a base structure of a commonly used dual-polarized radiation apparatus 1, and has a relatively wide application range.

It should be noted that, a projection area that is of the radiation base 111 on the second insulating base 21 and that faces the surface of the second insulating base 21 is a fifth projection area, and a projection area that is of the fifth through hole 7 on the second insulating base 21 and that faces the surface of the second insulating base 21 is a sixth projection area. To enable the plurality of first insulating bases 11 and the second insulating base 21 to be integrated by using the mold whose movable parts are to be ejected along the direction perpendicular to the second insulating base 21, the sixth projection area should overlap the fifth projection area, or the fifth projection area is located within a boundary range of the sixth projection area.

The metal feeding layer 122 is disposed in a plurality of manners. This is not specifically limited herein.

Figure 15:
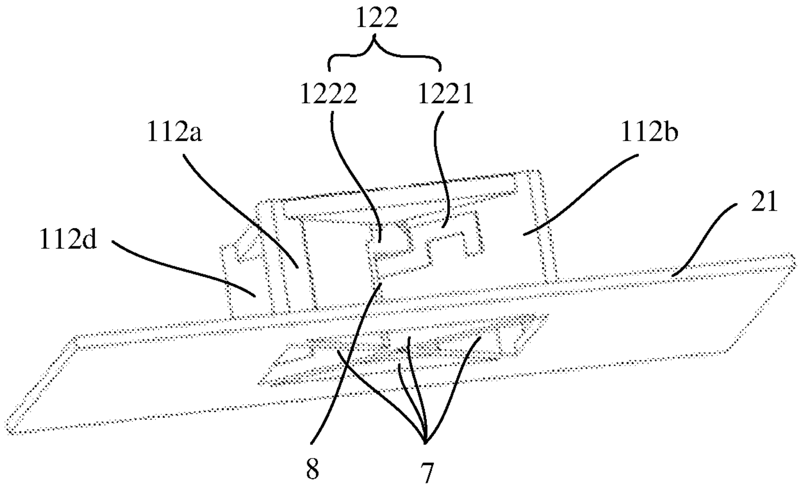
FIG. 15 is a schematic diagram of structures of a first feeding substrate, a second feeding substrate, a first metal feeding layer, a second metal feeding layer, a first notch, and a fifth through hole in the third type of antenna according to an embodiment of this application.

In some embodiments, as shown in FIG. 15, the metal feeding layer 122 includes a first metal feeding layer 1221 and a second metal feeding layer 1222. As shown in FIG. 14, the four feeding substrates include a first feeding substrate 112*a* and a third feeding substrate 112*c* opposite to each other and a second feeding substrate 112*b* and a fourth feeding substrate 112*d* opposite to each other. As shown in FIG. 15, a first notch 8 is provided at a position that is close to the central column and that is on an end face of one end that is of the first feeding substrate 112*a* and that is connected to the second insulating base 21, one inner side surface that is of the first notch 8 and that is close to the central column is coplanar with a surface of the second feeding substrate 112*b* and a surface of the fourth feeding substrate 112*d*, and the first metal feeding layer 1221 is attached to the surface of the second feeding substrate 112*b*, the inner side surface that is of the first notch 8 and that is close to the central column, and the surface of the fourth feeding substrate 112*d*. As shown in FIG. 14, a first groove 9 is provided at a position, opposite to one end that is of the second feeding substrate 112*b* and that is close to the central column 112*e*, on a surface that is of the radiation base 111 and that is away from the feeding base 112, the first groove 9 extends in a depth direction into the end that is of the second feeding substrate 112*b* and that is close to the central column, and one inner side surface that is of the first groove 9 and that is close to the central column is coplanar with a surface of the first feeding substrate 112*a* and a surface of the third feeding substrate 112*c*, and the first metal feeding layer 1221 is attached to the surface of the first feeding substrate 112*a*, the inner side surface that is of the first groove 9 and that is close to the central column, and the surface of the third feeding substrate 112*c*. In this way, power can be fed to the metal radiation layer 121 by using two feeding structures: the first metal feeding layer 1221 and the second metal feeding layer 1222, and this structure is simple and is easy to implement.

In some other embodiments, the metal feeding layer 122 includes a first metal feeding layer, a second metal feeding layer, a third metal feeding layer, and a fourth metal feeding layer. The four feeding substrates include a first feeding substrate 112*a* and a third feeding substrate 112*c* opposite to each other and a second feeding substrate 112*b* and a fourth feeding substrate 112*d* opposite to each other. The first metal feeding layer is attached to the first feeding substrate 112*a*, the second metal feeding layer is attached to the second feeding substrate 112*b*, the third metal feeding layer is attached to the third feeding substrate 112*c*, and the fourth metal feeding layer is attached to the fourth feeding substrate 112*d*. In this way, power can be fed to the metal radiation layer 121 by using each of four feeding structures: the first metal feeding layer, the second metal feeding layer, the third metal feeding layer, and the fourth metal feeding layer, with no need to provide a notch or a groove in the feeding base 112.

Figure 16:
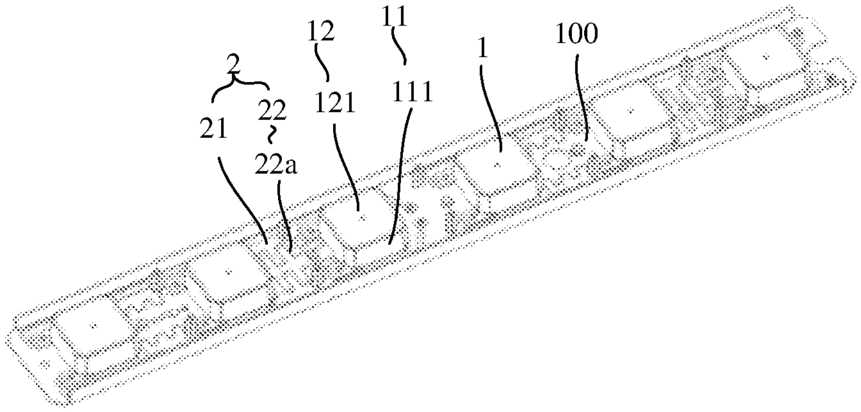
FIG. 16 is a schematic diagram of a front surface structure of a fourth type of antenna according to an embodiment of this application.
Figure 17:
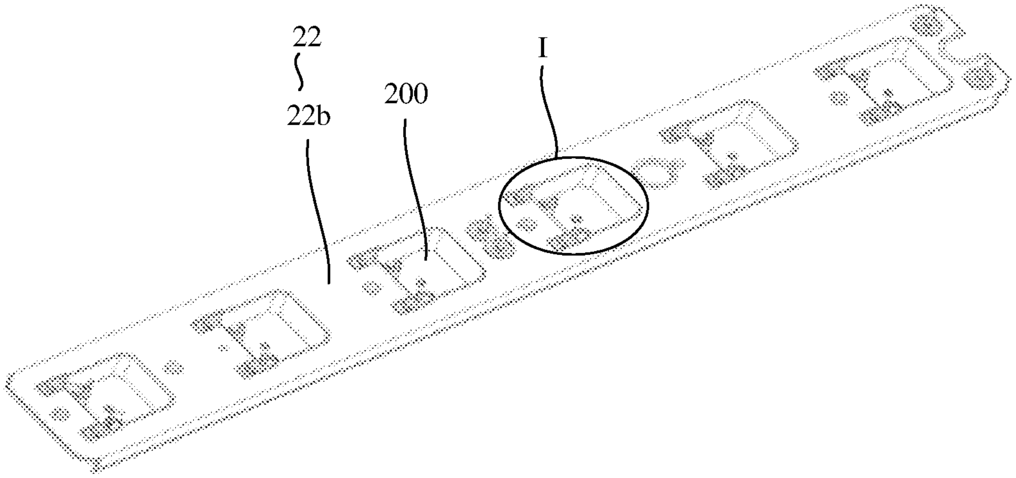
FIG. 17 is a schematic diagram of a back surface structure of the fourth type of antenna according to an embodiment of this application.
Figure 18:
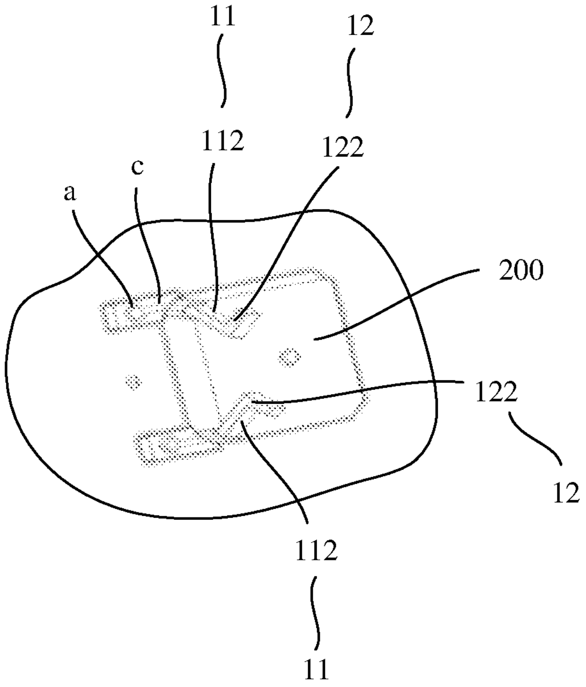
FIG. 18 is a schematic diagram of a partial structure of an area I in FIG. 17.

In a third optional embodiment, as shown in FIG. 16, the second insulating base 21 includes a first surface 100 and a second surface (not shown in the figure) that is away from the first surface 100, and the first insulating base 11 includes a radiation base 111 (as shown in FIG. 16) and a feeding base 112 (as shown in FIG. 18). As shown in FIG. 16, the radiation base 111 is a boss disposed on the first surface 100. As shown in FIG. 17, a second groove 200 is provided at a position that is on the second surface and that is opposite to the radiation base 111. As shown in FIG. 18, the feeding base 112 is disposed in the second groove 200, and the feeding base 112 is a columnar structure whose length direction is perpendicular to the second insulating base 21. The first metal conducting layer 12 includes a metal radiation layer 121 (as shown in FIG. 16) and a metal feeding layer 122 (as shown in FIG. 18), the metal radiation layer 121 is attached to the radiation base 111, and the metal feeding layer 122 is attached to the feeding base 112. In this way, the plurality of first insulating bases 11 and the second insulating base 21 can be integrated by using a mold whose movable parts are to be ejected along a direction perpendicular to the second insulating base 21, and the mold is simple and is easy to implement.

In the foregoing embodiment, a cross section of the feeding base 112 may be a cruciform cross section, an L-shaped cross section, or a cross section in another shape. This is not specifically limited herein. In addition, the metal feeding layer 122 may be attached to a side surface of the feeding base 112, or may be attached to an end face of the feeding base 112. This is not specifically limited herein. In some embodiments, as shown in FIG. 18, a cross section of the feeding base 112 is an L-shaped cross section, and the metal feeding layer 122 is attached to the end face of the feeding base 112. In this way, the metal feeding layer 122 can feed power to the metal radiation layer 121 through coupling.

The metal radiation layer 121 may be attached to a top surface of the radiation base 111, or may be attached to a side surface of the radiation base 111. This is not specifically limited herein. In some embodiments, as shown in FIG. 16, the metal radiation layer 121 is attached to the top surface of the radiation base 111.

Figure 21:
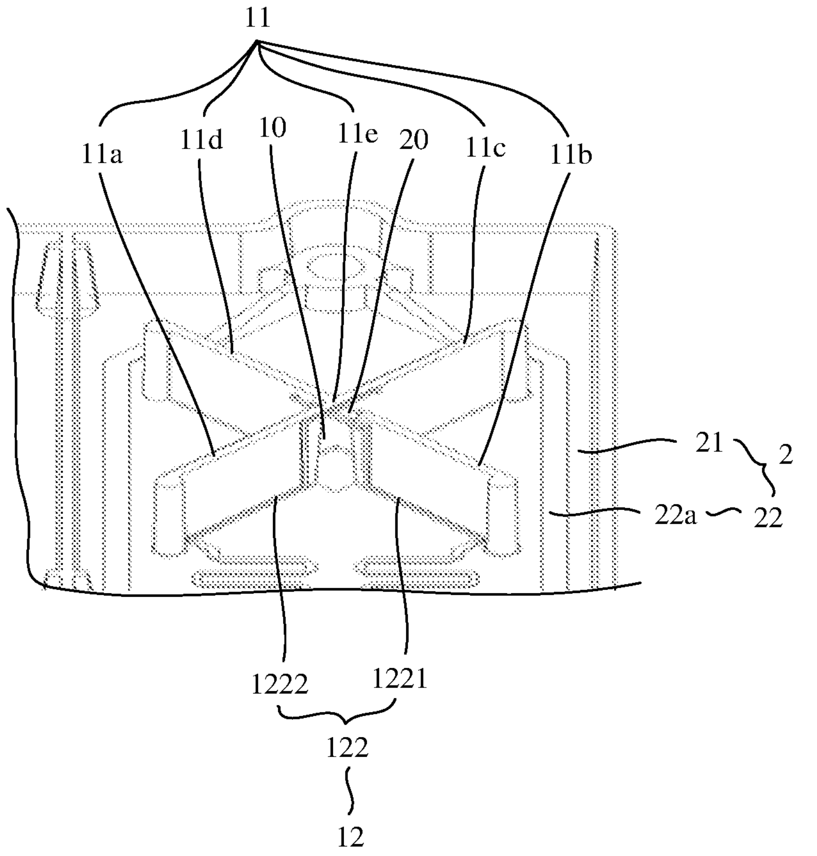
FIG. 21 is a schematic diagram of a first partial front surface structure of the fifth type of antenna according to an embodiment of this application.
Figure 25:
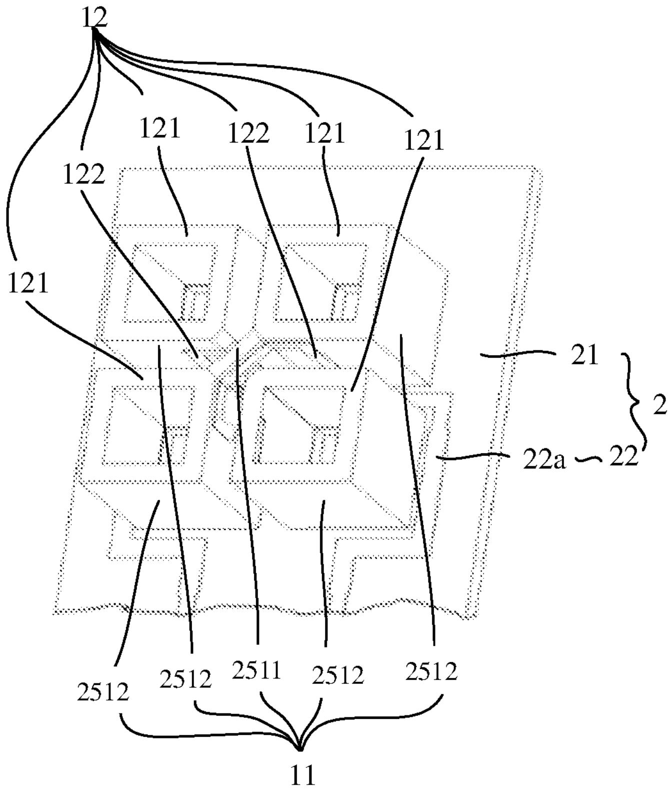
FIG. 25 is a schematic diagram of a partial front surface structure of the sixth type of antenna according to an embodiment of this application.

In a fourth optional embodiment, as shown in FIG. 21 or FIG. 25, the first insulating base 11 is a columnar structure whose length direction is perpendicular to the second insulating base 21, the first metal conducting layer 12 includes a metal radiation layer 121 and a metal feeding layer 122, and both the metal radiation layer 121 and the metal feeding layer 122 are attached to the first insulating base 11. In this way, the plurality of first insulating bases 11 and the second insulating base 21 can be integrated by using a mold whose movable parts are to be ejected along a direction perpendicular to the second insulating base 21, and the mold is simple and is easy to implement.

Figure 19:
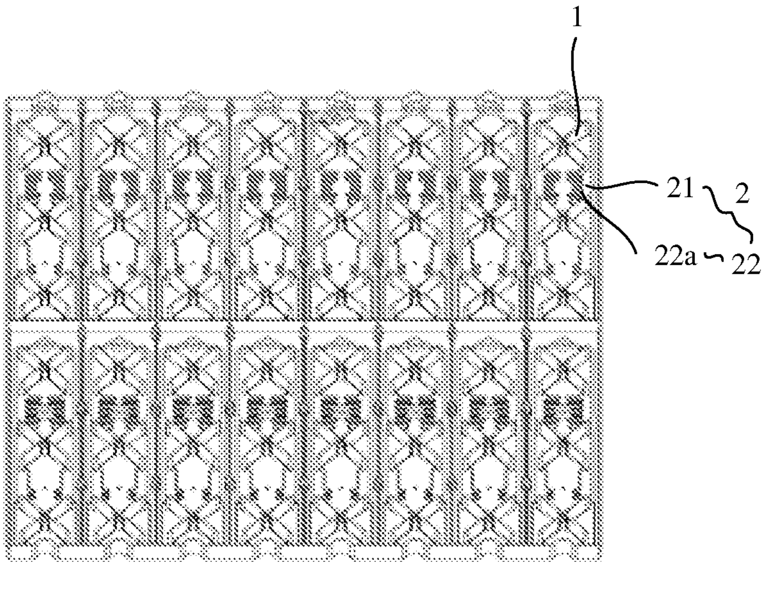
FIG. 19 is a schematic diagram of a front surface structure of a fifth type of antenna according to an embodiment of this application.

In some embodiments, as shown in FIG. 19 and FIG. 21, a cross section of the columnar structure is a cruciform cross section. In this way, the first insulating base 11 has a simple structure, so that a mold for molding the entire structure has a simple structure, and the entire structure is easy to fabricate.

Figure 22:
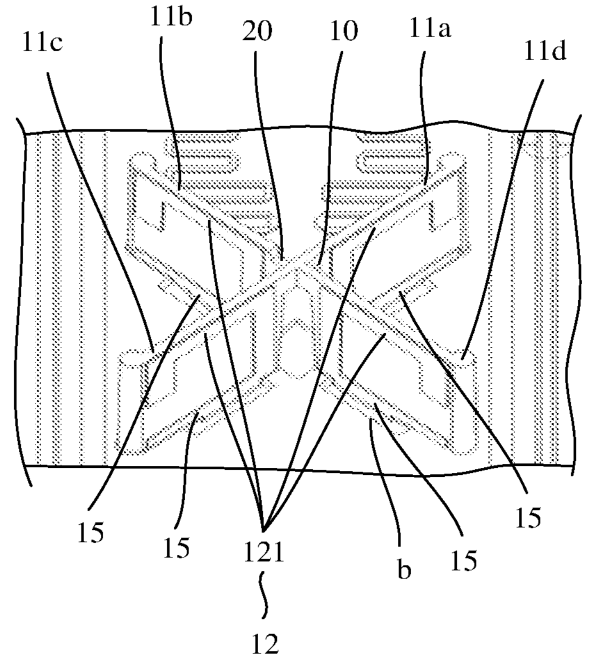
FIG. 22 is a schematic diagram of a second partial front surface structure of the fifth type of antenna according to an embodiment of this application.

In the foregoing embodiment, the metal feeding layer 122 is disposed in a plurality of manners. This is not specifically limited herein. For example, as shown in FIG. 21, the first insulating base 11 includes a central column 11*e* in an intersection area whose cross section is the cruciform cross section and four insulating substrates partitioned by the central column 11*e*, and the four insulating substrates include a first insulating substrate 11*a* and a third insulating substrate 11*c* opposite to each other and a second insulating substrate 11*b* and a fourth insulating substrate 11*d* opposite to each other. The metal feeding layer 122 includes a first metal feeding layer 1221 and a second metal feeding layer 1222. A third groove 10 is provided at a position, opposite to one end that is of the first insulating substrate 11*a* and that is close to the central column 11*e*, on a surface that is of the second insulating base 21 and that is away from the first insulating base 11, the third groove 10 extends in a depth direction into the end that is of the first insulating substrate 11*a* and that is close to the central column 11*e*, one inner side surface that is of the third groove 10 and that is close to the central column 11*e* is coplanar with a surface of the second insulating substrate 11*b* and a surface of the fourth insulating substrate 11*d*, and the first metal feeding layer 1221 is attached to the surface of the second insulating substrate 11*b*, the inner side surface that is of the third groove 10 and that is close to the central column 11*e*, and the surface of the fourth insulating substrate 11*d*. As shown in FIG. 21 and FIG. 22, a second notch 20 is provided at a position that is close to the central column 11*e* and that is on an end face that is of the second insulating substrate 11*b* and that is away from the second insulating base 21, one inner side surface that is of the second notch 20 and that is close to the central column 11*e* is coplanar with a surface of the first insulating substrate 11*a* and a surface of the third insulating substrate 11*c*, and the second metal feeding layer 1222 is attached to the surface of the first insulating substrate 11*a*, the inner side surface that is of the second notch 20 and that is close to the central column 11*e*, and the surface of the third insulating substrate 11*c*. In this way, power can be fed to the metal radiation layer 121 by using two feeding structures: the first metal feeding layer 1221 and the second metal feeding layer 1222, and this structure is simple and is easy to implement.

Figure 24:
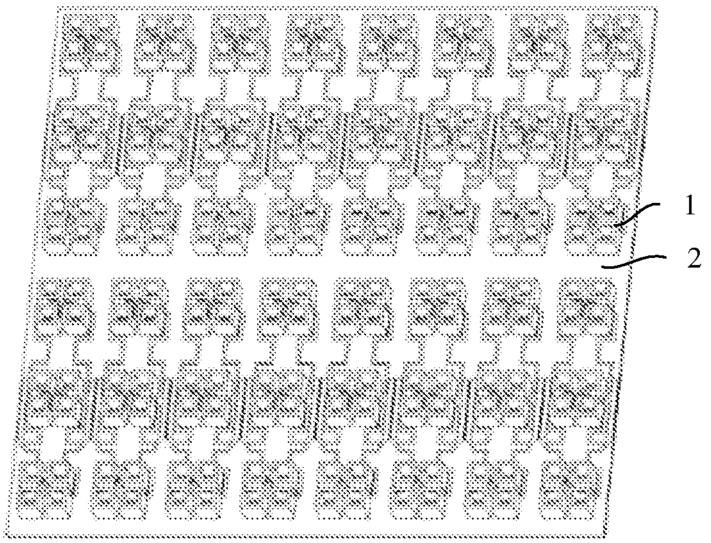
FIG. 24 is a schematic diagram of a front surface structure of a sixth type of antenna according to an embodiment of this application.

In some other embodiments, as shown in FIG. 24 and FIG. 25, the columnar structure includes a first columnar structure 2511 located at a center and four second columnar structures 2512 located at edges, and a cross section of the first columnar structure 2511 is a cruciform cross section. The first columnar structure 2511 includes a central column in an intersection area whose cross section is the cruciform cross section and four insulating plates partitioned by the central column, the four second columnar structures 2512 are connected, in a one-to-one correspondence, to ends that are of the four insulating plates and that are away from the central column, and the second columnar structure 2512 is a hollow column. The metal radiation layer 121 is disposed on end faces of ends that are of the four second columnar structures 2512 and that are away from the second insulating base 21, and the metal feeding layer 122 is attached to a side surface of the first columnar structure 2511 and side surfaces of the four second columnar structures 2512. This structure has a relatively large area for disposing the metal radiation layer 121, so that the radiation apparatus 1 has relatively excellent radiation performance.

Figure 11:
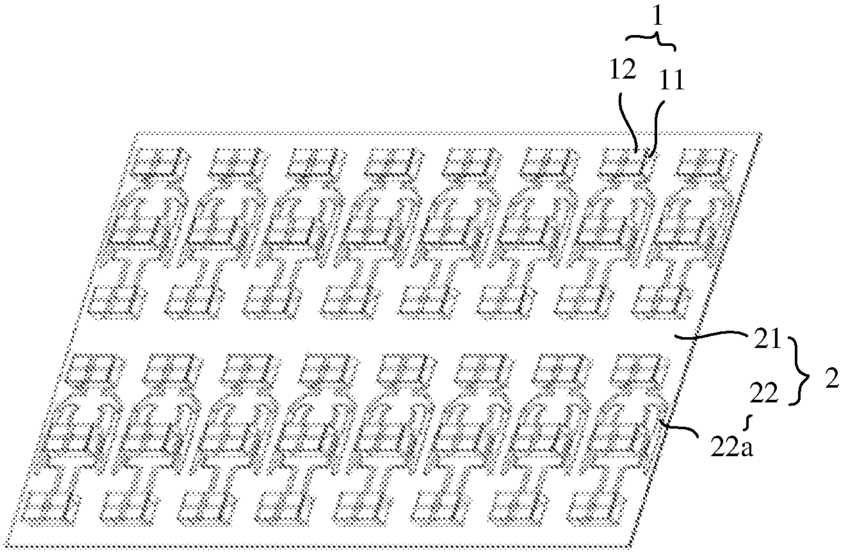
FIG. 11 is a schematic diagram of a front surface structure of a third type of antenna according to an embodiment of this application.
Figure 12:
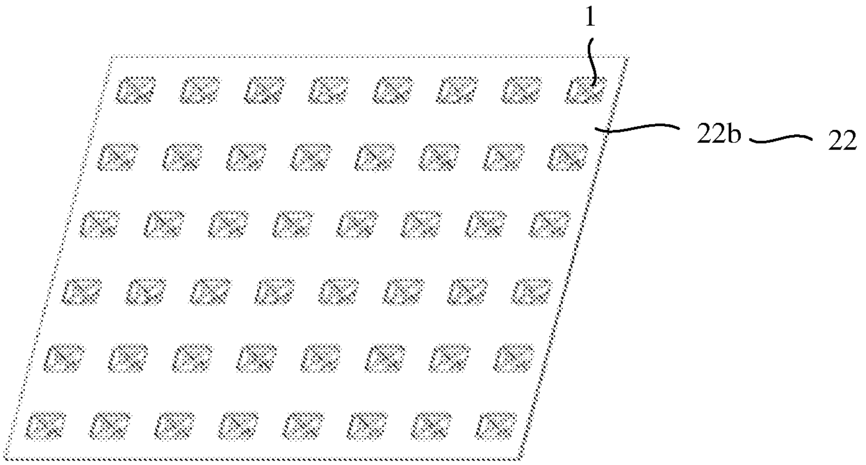
FIG. 12 is a schematic diagram of a back surface structure of the third type of antenna according to an embodiment of this application.
Figure 20:
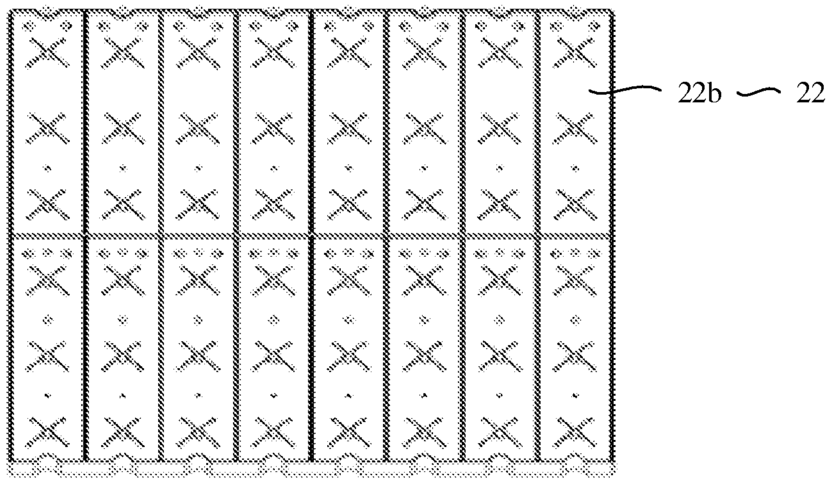
FIG. 20 is a schematic diagram of a back surface structure of the fifth type of antenna according to an embodiment of this application.
Figure 23:
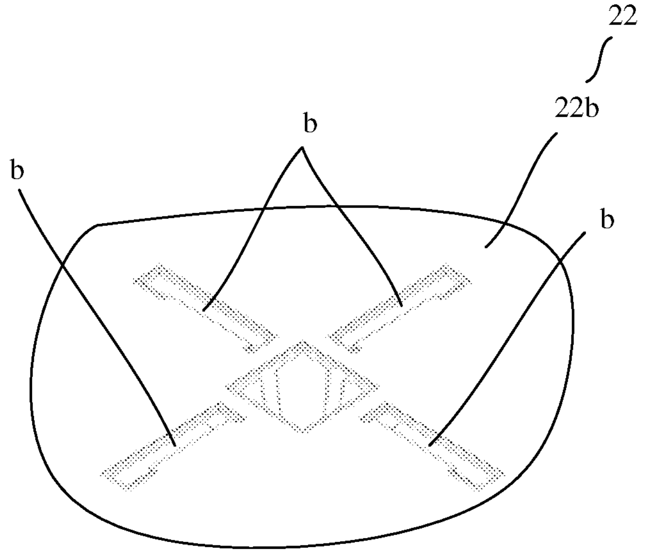
FIG. 23 is a schematic diagram of a partial back surface structure of the fifth type of antenna according to an embodiment of this application.

In the foregoing first optional embodiment, second optional embodiment, third optional embodiment, and fourth optional embodiment, a surface that is of the second insulating base 21 and that faces the first insulating base 11 is a front surface, and the surface that is of the second insulating base 21 and that faces the first insulating base 11 is a back surface. As shown in FIG. 5 and FIG. 7, as shown in FIG. 11 and FIG. 12, as shown in FIG. 16 and FIG. 17, as shown in FIG. 19 and FIG. 20, or as shown in FIG. 25, the second metal conducting layer 22 includes a feed transport layer 22*a* and a first ground layer 22*b*, one of the feed transport layer 22*a* and the first ground layer 22*b* is attached to the front surface, and the other of the feed transport layer 22*a* and the first ground layer 22*b* is attached to the back surface. The metal feeding layer 122 is configured to feed, into the metal radiation layer 121, a signal transmitted through the feed transport layer 22*a*. Generally, the first metal conducting layer 12 further includes a second ground layer (not shown in the figure), and the second ground layer is opposite to the metal feeding layer 122. To enable the metal feeding layer 122 to feed, into the metal radiation layer 121, the signal transmitted through the feed transport layer 22*a*, the metal feeding layer 122 should be conductively connected to the feed transport layer 22*a*, and the second ground layer should be conductively connected to the first ground layer 22*b*. When a surface to which the metal feeding layer 122 is attached can be connected to a surface to which the feed transport layer 22*a* is attached, the metal feeding layer 122 may be conductively connected to the feed transport layer 22*a* directly. When the surface to which the metal feeding layer 122 is attached cannot be connected to the surface to which the feed transport layer 22*a* is attached, a through hole or a through groove may be provided in the second insulating base 21, so that the metal feeding layer 122 can be conductively connected to the feed transport layer 22*a* along an inner wall of the through hole or the through groove. Similarly, when a surface to which the first ground layer 22*b* is attached can be connected to a surface to which the second ground layer is attached, the first ground layer 22*b* may be conductively connected to the second ground layer directly. When the surface to which the first ground layer 22*b* is attached cannot be connected to the surface to which the second ground layer is attached, a through hole or a through groove may be provided in the second insulating base 21, so that the first ground layer 22*b* can be conductively connected to the second ground layer along an inner wall of the through hole or the through groove. For example, as shown in FIG. 16, FIG. 17, and FIG. 18, a plane on which the metal feeding layer 122 is located cannot be connected to a plane on which the feed transport layer 22*a* is located. Therefore, as shown in FIG. 18, a through hole a is provided in the second insulating base 21, so that the metal feeding layer 122 can be conductively connected to the feed transport layer 22*a* through an inner wall of the through hole a and a feeding connection layer c. For another example, as shown in FIG. 21, FIG. 22, and FIG. 23, a plane on which the second ground layer 15 is located cannot be connected to a plane on which the first ground layer 22*b* is located. Therefore, as shown in FIG. 22 and FIG. 23, a through groove b is provided in the second insulating base 21, so that the second ground layer 15 can be conductively connected to the first ground layer 22*b* through an inner wall of the through groove b.

In some embodiments, as shown in FIG. 3, the antenna further includes a shielding frame 3. The shielding frame 3 includes a first surface (not shown in the figure) and a second surface 300 that is away from the first surface, and the shielding frame 3 defines a plurality of cavities 31 penetrating through the first surface and the second surface 300. The plurality of cavities 31 are in a one-to-one correspondence with the plurality of radiation apparatuses 1. The first surface of the shielding frame 3 is fastened to the second insulating base 21. Each radiation apparatus 1 is located in a cavity 31 corresponding to the radiation apparatus 1. Crosstalk between each radiation apparatus 1 and another radiation apparatus 1 can be avoided by using the shielding frame 3.

In some embodiments, the shielding frame 3 includes a third insulating base 32 and a third metal conducting layer 33 attached to the third insulating base 32, and the third insulating base 32 and the second insulating base 21 are integrated together. In this way, a quantity of components included in the antenna can be reduced, and assembly complexity of the antenna can be reduced. In the foregoing embodiments, the third metal conducting layer is a metal conducting layer used to implement a signal shielding function.

In some embodiments, dielectric loss angular tangents of materials of the first insulating base 11 and the second insulating base 21 in a range of 600 MHz to 6 GHz are less than 0.01. In this way, after an electric field is applied to the materials of the first insulating base 11 and the second insulating base 21, dielectric losses of the materials of the first insulating base 11 and the second insulating base 21 are relatively small, a relatively small amount of heat is generated, and performance of the antenna is relatively excellent.

Optionally, the first insulating base 11 and the second insulating base 21 include but are not limited to polyphenylene sulphide (PPS) and its modified material, polyphenylene oxide (PPO) and its modified material, liquid crystal polymer (LCP) and its modified material, polyetherimide (PEI) and its modified material, syndiotactic polystyrene (SPS) and its modified material, cyclic polyolefin and its modified material, or fluoroplastic and its modified material.

Figure 26:
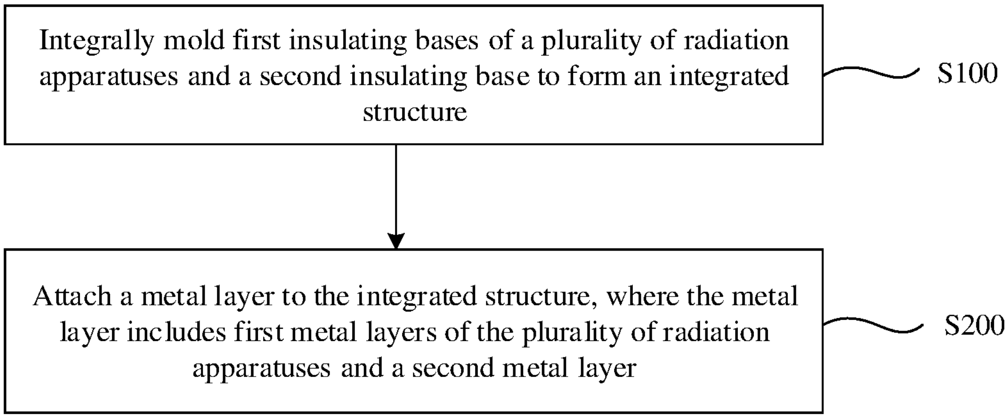
FIG. 26 is a first type of flowchart of an antenna processing method according to an embodiment of this application.

According to a second aspect, an embodiment of this application provides an antenna processing method. An antenna includes a feeding base plate and a plurality of radiation apparatuses disposed on the feeding base plate, each of the plurality of radiation apparatuses includes a first insulating base and a first metal conducting layer attached to the first insulating base, the feeding base plate includes a plate-shaped second insulating base and a second metal conducting layer attached to the second insulating base. As shown in FIG. 26, the processing method includes the following steps:

S100: Integrally mold first insulating bases of the plurality of radiation apparatuses and the second insulating base to form an integrated structure.

S200: Attach a metal conducting layer to the integrated structure, where the metal conducting layer includes first metal conducting layers of the plurality of radiation apparatuses and the second metal conducting layer.

The antenna processing method provided in this embodiment includes: integrally molding the first insulating bases of the plurality of radiation apparatuses and the second insulating base to form the integrated structure; and attaching the metal conducting layer to the integrated structure, where the metal conducting layer includes the first metal conducting layers of the plurality of radiation apparatuses and the second metal conducting layer. Therefore, a manner such as welding or structural connection does not need to be used to implement assembly between the radiation apparatuses and the feeding base plate and assembly between components inside the radiation apparatuses. In this case, the antenna includes a relatively small quantity of components and has relatively low structural complexity, and no welding or assembly operations are required, so that assembly difficulty is relatively low. In addition, there is no welding point or connection point inside the antenna. Therefore, performance of the antenna can be ensured.

Figure 27:
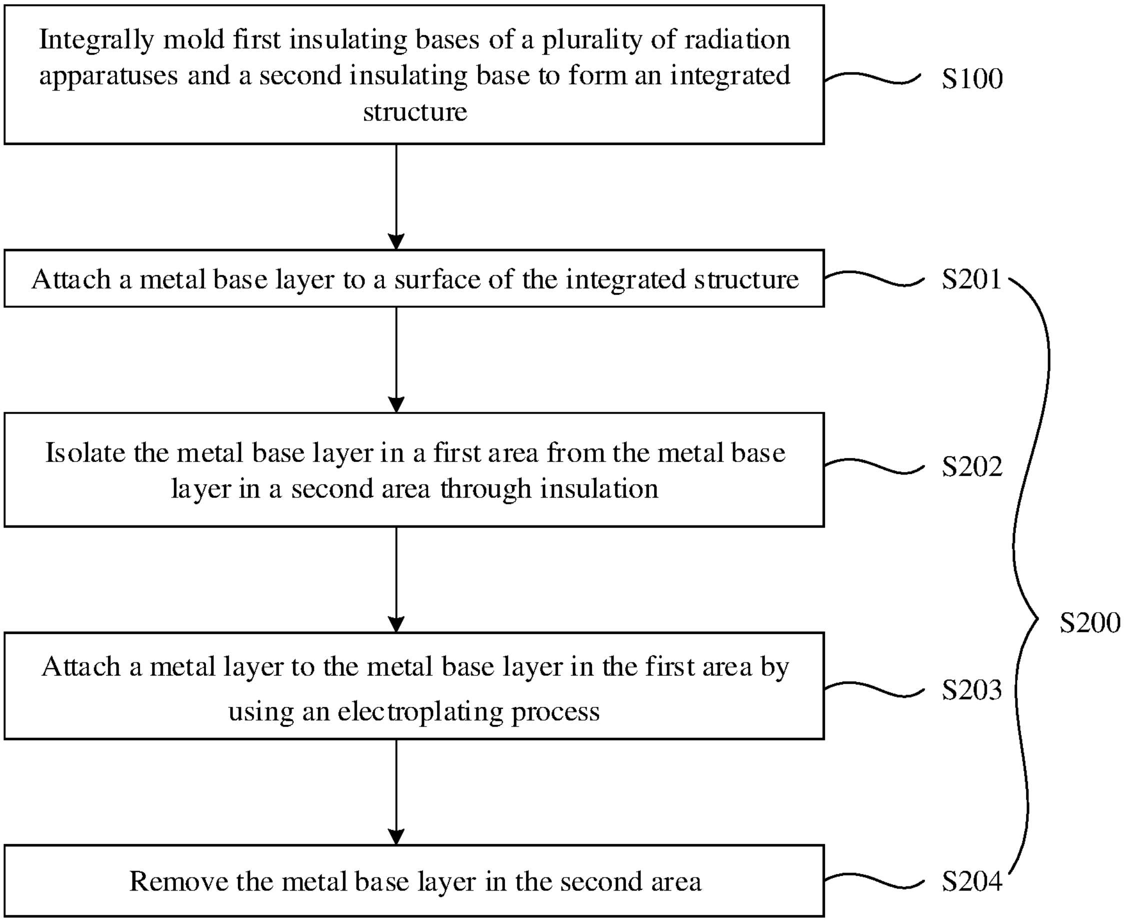
FIG. 27 is a second type of flowchart of an antenna processing method according to an embodiment of this application.

In some embodiments, as shown in FIG. 27, step S200 includes: S201: Attach a metal base layer to a surface of the integrated structure. S202: Isolate the metal base layer in a first area from the metal base layer in a second area through insulation, where the first area is an area that is on the surface of the integrated structure and in which the metal conducting layer is to be disposed, and the second area is an area on the surface of the integrated structure other than the area in which the metal conducting layer is to be disposed. S203: Attach the metal conducting layer to the metal base layer in the first area by using an electroplating process. S204: Remove the metal base layer in the second area. This method is simple, and the electroplating process is mature and is easy to implement.

In the foregoing embodiments, a material of the metal base layer may be nickel, copper, another metal, or an alloy. A material of the metal conducting layer includes but is not limited to copper, gold, silver, and an alloy of copper, gold, and silver.

In some embodiments, step S201 includes: attaching the metal base layer to the surface of the integrated structure by using an electroless plating process. A plated layer formed by using the electroless plating process is uniform, and there is high bonding strength between the plated layer and a base. This can improve scratch resistance of the metal base layer.

In some embodiments, step S202 includes: removing the metal base layer on a path at an edge of the first area by using a laser radium carving process, to isolate the metal base layer in the first area from the metal base layer in the second area through insulation.

In some embodiments, step S203 includes: attaching the metal conducting layer to the metal base layer in the first area by using the electroplating process, and making a thickness of the metal conducting layer greater than that of the metal base layer. Step S204 includes: simultaneously etching the metal base layer in the second area and the metal conducting layer in the first area to remove the entire metal base layer in the second area and a part of the metal conducting layer in the first area. This method is simple and is easy to operate.

In the present disclosure, the described specific features, structures, materials, or characteristics may be combined in a proper manner in any one or more of the example embodiments.

Finally, it should be noted that the foregoing embodiments are merely intended for describing the technical solutions of this application, but not for limiting this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. An antenna, comprising a feeding base plate and a plurality of radiation apparatuses disposed on the feeding base plate, wherein the feeding base plate is configured to feed power to the plurality of radiation apparatuses; and each of the plurality of radiation apparatuses comprises a first insulating base and a first metal conducting layer attached to the first insulating base, the feeding base plate comprises a plate-shaped second insulating base and a second metal conducting layer attached to the second insulating base, and first insulating bases of the plurality of radiation apparatuses and the second insulating base are integrated together, wherein the first insulating base is a columnar structure whose length direction is perpendicular to the second insulating base, the first metal conducting layer comprises a metal radiation layer and a metal feeding layer, and both the metal radiation layer and the metal feeding layer are attached to the first insulating base, wherein the columnar structure comprises a first columnar structure located at a center and four second columnar structures located at edges, and a cross section of the first columnar structure is a cruciform cross section;

the first columnar structure comprises a central column in an intersection area whose cross section is the cruciform cross section and four insulating plates partitioned by the central column, the four second columnar structures are connected, in a one-to-one correspondence, to ends that are of the four insulating plates and that are away from the central column, and the second columnar structure is a hollow column, and the metal radiation layer is disposed on end faces of ends that are of the four second columnar structures and that are away from the second insulating base, and the metal feeding layer is attached to a side surface of the first columnar structure and side surfaces of the four second columnar structures.

2. The antenna according to claim 1, wherein a cross section of the columnar structure is a cruciform cross section.

3. The antenna according to claim 2, wherein the first insulating base comprises a central column in an intersection area whose cross section is the cruciform cross section and four insulating substrates partitioned by the central column, and the four insulating substrates comprise a first insulating substrate and a third insulating substrate opposite to each other and a second insulating substrate and a fourth insulating substrate opposite to each other;

the metal feeding layer comprises a first metal feeding layer and a second metal feeding layer;

a third groove is provided at a position, opposite to one end that is of the first insulating substrate and that is close to the central column, on a surface that is of the second insulating base and that is away from the first insulating base, the third groove extends in a depth direction into the end that is of the first insulating substrate and that is close to the central column, one inner side surface that is of the third groove and that is close to the central column is coplanar with a surface of the second insulating substrate and a surface of the fourth insulating substrate, and the first metal feeding layer is attached to the surface of the second insulating substrate, the inner side surface that is of the third groove and that is close to the central column, and the surface of the fourth insulating substrate; and a second notch is provided at a position that is close to the central column and that is on an end face that is of the second insulating substrate and that is away from the second insulating base, one inner side surface that is of the second notch and that is close to the central column is coplanar with a surface of the first insulating substrate and a surface of the third insulating substrate, and the second metal feeding layer is attached to the surface of the first insulating substrate, the inner side surface that is of the second notch and that is close to the central column, and the surface of the third insulating substrate.

4. The antenna according to claim 1, further comprising a shielding frame, wherein the shielding frame comprises a first surface and a second surface that is away from the first surface, the shielding frame defines a plurality of cavities penetrating through the first surface and the second surface, the plurality of cavities are in a one-to-one correspondence with the plurality of radiation apparatuses, the first surface of the shielding frame is fastened to the second insulating base, and each of the plurality of radiation apparatuses is located in a cavity corresponding to the radiation apparatus.

5. The antenna according to claim 4, wherein the shielding frame comprises a third insulating base and a third metal conducting layer attached to the third insulating base, and the third insulating base and the second insulating base are integrated together.

6. The antenna according to claim 1, wherein dielectric loss angular tangents of materials of the first insulating base and the second insulating base in a range of 600 MHz to 6 GHz are less than 0.01.

7. The antenna according to claim 6, wherein the first insulating base and the second insulating base comprise polyphenylene sulphide, polyphenylene oxide, liquid crystal polymer, polyetherimide, syndiotactic polystyrene, cyclic polyolefin, or fluoroplastic.

8. An antenna processing method, wherein an antenna comprises a feeding base plate and a plurality of radiation apparatuses disposed on the feeding base plate, each of the plurality of radiation apparatuses comprises a first insulating base and a first metal conducting layer attached to the first insulating base, and the feeding base plate comprises a plate-shaped second insulating base and a second metal conducting layer attached to the second insulating base; and the antenna processing method comprises:

integrally molding first insulating bases of the plurality of radiation apparatuses and the second insulating base to form an integrated structure; and attaching a metal conducting layer to the integrated structure, wherein the metal conducting layer comprises first metal conducting layers of the plurality of radiation apparatuses and the second metal conducting layer, wherein the first insulating base is a columnar structure whose length direction is perpendicular to the second insulating base, the first metal conducting layer comprises a metal radiation layer and a metal feeding layer, and both the metal radiation layer and the metal feeding layer are attached to the first insulating base, wherein the columnar structure comprises a first columnar structure located at a center and four second columnar structures located at edges, and a cross section of the first columnar structure is a cruciform cross section;

the first columnar structure comprises a central column in an intersection area whose cross section is the cruciform cross section and four insulating plates partitioned by the central column, the four second columnar structures are connected, in a one-to-one correspondence, to ends that are of the four insulating plates and that are away from the central column, and the second columnar structure is a hollow column; and the antenna processing method further comprises:

disposing the metal radiation layer on end faces of ends that are of the four second columnar structures and that are away from the second insulating base; and attaching the metal feeding layer to a side surface of the first columnar structure and side surfaces of the four second columnar structures.

9. The antenna processing method according to claim 8, wherein the attaching a metal conducting layer to the integrated structure comprises:

attaching a metal base layer to a surface of the integrated structure;

isolating the metal base layer in a first area from the metal base layer in a second area through insulation, wherein the first area is an area that is on the surface of the integrated structure and in which the metal conducting layer is to be disposed, and the second area is an area on the surface of the integrated structure other than the area in which the metal conducting layer is to be disposed;

attaching the metal conducting layer to the metal base layer in the first area by using an electroplating process; and removing the metal base layer in the second area.

* * * * *